(12) United States Patent
Kim et al.

(10) Patent No.: US 11,032,462 B2
(45) Date of Patent: Jun. 8, 2021

(54) METHOD FOR ADJUSTING FOCUS BASED ON SPREAD-LEVEL OF DISPLAY OBJECT AND ELECTRONIC DEVICE SUPPORTING THE SAME

(71) Applicant: Samsung Electronics Co., Ltd., Suwon-si (KR)

(72) Inventors: Soonae Kim, Suwon-si (KR); Jaehyoung Park, Suwon-si (KR); Kyunghoon Yoon, Suwon-si (KR); Jeongwon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/359,037

(22) Filed: Mar. 20, 2019

(65) Prior Publication Data

US 2019/0297249 A1    Sep. 26, 2019

(30) Foreign Application Priority Data

Mar. 21, 2018    (KR) .......................... 10-2018-0032682

(51) Int. Cl.
*H04N 5/232* (2006.01)
*G03B 13/36* (2021.01)
(Continued)

(52) U.S. Cl.
CPC ......... *H04N 5/23212* (2013.01); *G03B 13/36* (2013.01); *H04N 5/2226* (2013.01); *H04N 13/271* (2018.05)

(58) Field of Classification Search
CPC .................................................. H04N 5/23212
See application file for complete search history.

(56) References Cited

U.S. PATENT DOCUMENTS

| 5,212,516 A | 5/1993 | Yamada et al. |
| 2004/0165090 A1* | 8/2004 | Ning .................. H04N 9/04519 348/272 |

(Continued)

FOREIGN PATENT DOCUMENTS

| JP | 2015-121774 A | 7/2015 |
| JP | 2016-061609 A | 4/2016 |

OTHER PUBLICATIONS

International Search Report dated Jul. 3, 2019, issued in International Patent Application No. PCT/KR2019/003255.

(Continued)

*Primary Examiner* — Christopher K Peterson
(74) *Attorney, Agent, or Firm* — Jefferson IP Law, LLP (57) ABSTRACT

An electronic device is provided. The electronic device includes a processor configured to obtain a first image of an external object, generate a first color image and a second color image by using the first image, identify a difference in first spread level between a display object of the first color image and the display object of the second color image, determine a first on-focus position of a lens w based on the difference in first spread level, move the lens in a direction corresponding to the first on-focus position, obtain a second image of the external object, determine a second on-focus position of the lens based on a difference in second spread level between the external object contained in the first image and the external object contained in the second image, and move the lens to the second on-focus position.

10 Claims, 8 Drawing Sheets

(51) Int. Cl.
*H04N 13/271* (2018.01)
*H04N 5/222* (2006.01)
*H04N 9/04* (2006.01)

(56) References Cited

U.S. PATENT DOCUMENTS

| | | |
|---|---|---|
| 2010/0188558 A1 | 7/2010 | Gamadia et al. |
| 2011/0199534 A1 | 8/2011 | Kawai |
| 2013/0100334 A1 | 4/2013 | Blayvas |
| 2015/0138429 A1 | 5/2015 | Ogura et al. |
| 2015/0281552 A1 | 10/2015 | Ogura et al. |
| 2016/0080727 A1 | 3/2016 | Komatsu et al. |

OTHER PUBLICATIONS

Extended European Search Report dated Dec. 22, 2020, issued in European Patent Application No. 19770677.3.

* cited by examiner

METHOD FOR ADJUSTING FOCUS BASED ON SPREAD-LEVEL OF DISPLAY OBJECT AND ELECTRONIC DEVICE SUPPORTING THE SAME

CROSS-REFERENCE TO RELATED APPLICATION(S)

This application is based on and claims priority under 35 U.S.C. § 119(a) of a Korean patent application number 10-2018-0032682, filed on Mar. 21, 2018, in the Korean Intellectual Property Office, the disclosure of which is incorporated by reference herein in its entirety.

BACKGROUND

1. Field

The disclosure relates to a method for adjusting focus based on the spread level of a display object and an electronic device supporting the method.

Advances in communication and semiconductor technologies have enabled rapid popularization of electronic devices. Electronic devices have evolved into convergence devices supporting heterogeneous functions having originated from distinct fields. For example, some electronic devices support camera functions that enable users to capture images of a target object and store the captured images or moving images. Advanced electronic devices may provide more than two cameras of different types, thereby enhancing user convenience.

Recently, technologies are emerging that use camera modeling to estimate the distance between the camera and the target object and automatically adjust the focus. For example, depth from focus (DFF) and depth from defocus (DFD) techniques have been developed for automatic focus adjustment.

In particular, the DFD technique estimates the distance between the camera and the target object using images containing a blur due to defocus. For example, images of a target object are captured at two different positions, and the distance between the camera and the target object may be estimated. The DFD technique can rapidly and efficiently measure the distances by using at least two defocused images.

Meanwhile, in the case of the DFD technique, as images are taken at two positions and the lens position is moved to the on-focus position, a large amount of power may be unnecessarily consumed owing to the repeated movement of the actuator compared with a process of finding on-focus through one time movement.

Since images are taken at two positions and the position of the lens is moved to the on-focus position, the position of the lens can be repeatedly moved around the on-focus position, which may generate a wobbling phenomenon causing inconvenience to the user.

In addition, since two or more images must always be obtained, the speed of finding on-focus may be lowered.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for adjusting focus based on the spread level of a display object and an electronic device supporting the method.

Additional aspects will be set forth in part in the description which follows and, in part, will be apparent from the description, or may be learned by practice of the presented embodiments.

In accordance with an aspect of the disclosure, an electronic device is provided. The electronic device includes a camera comprising a lens assembly including one or more lenses, an actuator configured to move at least one lens of the lens assembly and an image sensor, and a processor configured to obtain a first image of an external object using the image sensor, generate a first color image, which corresponds to a first color, and a second color image, which corresponds to a second color, by using the first image, identify, for a display object contained in the first image, a difference in first spread level between the display object of the first color image and the display object of the second color image, determine a first on-focus position of the at least one lens with respect to the external object based on at least the difference in first spread level, move the at least one lens in a direction corresponding to the first on-focus position by using the actuator, obtain, in a state where the at least one lens is at least partially moved in the direction corresponding to the first on-focus position, a second image of the external object by using the image sensor, determine a second on-focus position of the at least one lens with respect to the external object based on at least a difference in second spread level between the external object contained in the first image and the external object contained in the second image, and move the at least one lens to the second on-focus position by using the actuator.

In accordance with another aspect of the disclosure, an electronic device is provided. The electronic device includes a camera module comprising a lens assembly including one or more lenses, an actuator configured to move at least one lens of the lens assembly and an image sensor, and a processor configured to obtain a first image of an external object using the image sensor, generate a first color image, which corresponds to a first color, and a second color image, which corresponds to a second color, by using the first image, identify, for a display object contained in the first image, a difference in first spread level between the display object of the first color image and the display object of the second color image, determine a first on-focus position of the at least one lens with respect to the external object based on at least the difference in first spread level, calculate a confidence for the difference in first spread level and if the calculated confidence satisfies a preset condition, move the at least one lens to the first on-focus position by using the actuator.

In accordance with another aspect of the disclosure, a method for focus adjustment is provided. The method includes obtaining a first image of an external object by using a camera, generating a first color image, which corresponds to a first color, and a second color image, which corresponds to a second color, by using the first image, identifying, for a display object contained in the first image, a difference in first spread level between the display object of the first color image and the display object of the second color image, determining a first on-focus position of at least one lens in the camera with respect to the external object based on at least the difference in first spread level, moving the at least one lens of the camera in a direction corresponding to the first on-focus position, obtaining, in a state where the at least one lens is at least partially moved in the direction corresponding to the first on-focus position, a second image of the external object, determining a second on-focus position of the at least one lens with respect to the external object based on at least a difference in second spread level between the external object contained in the first image and the external object contained in the second image, and moving the at least one lens to the second on-focus position.

In accordance with another aspect of the disclosure, a method for automatic focus adjustment for an electronic device is provided. The method includes obtaining a first image of an external object by using a camera, generating a first color image, which corresponds to a first color, and a second color image, which corresponds to a second color, by using the first image, identifying, for a display object contained in the first image, a difference in first spread level between the display object of the first color image and the display object of the second color image, determining a first on-focus position of at least one lens in the camera with respect to the external object based on at least the difference in first spread level, calculating a confidence for the difference in first spread level and if the confidence satisfies a preset condition, moving the at least one lens to the first on-focus position by using an actuator.

In a feature of the disclosure, the electronic device and its automatic focus adjustment method can improve the speed and prevent the wobbling phenomenon while reducing the power consumed by the actuator.

In another feature of the disclosure, if the electronic device and its automatic focus adjustment method can estimate the on-focus position using a single image, they can prevent unnecessary acquisition of two images.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
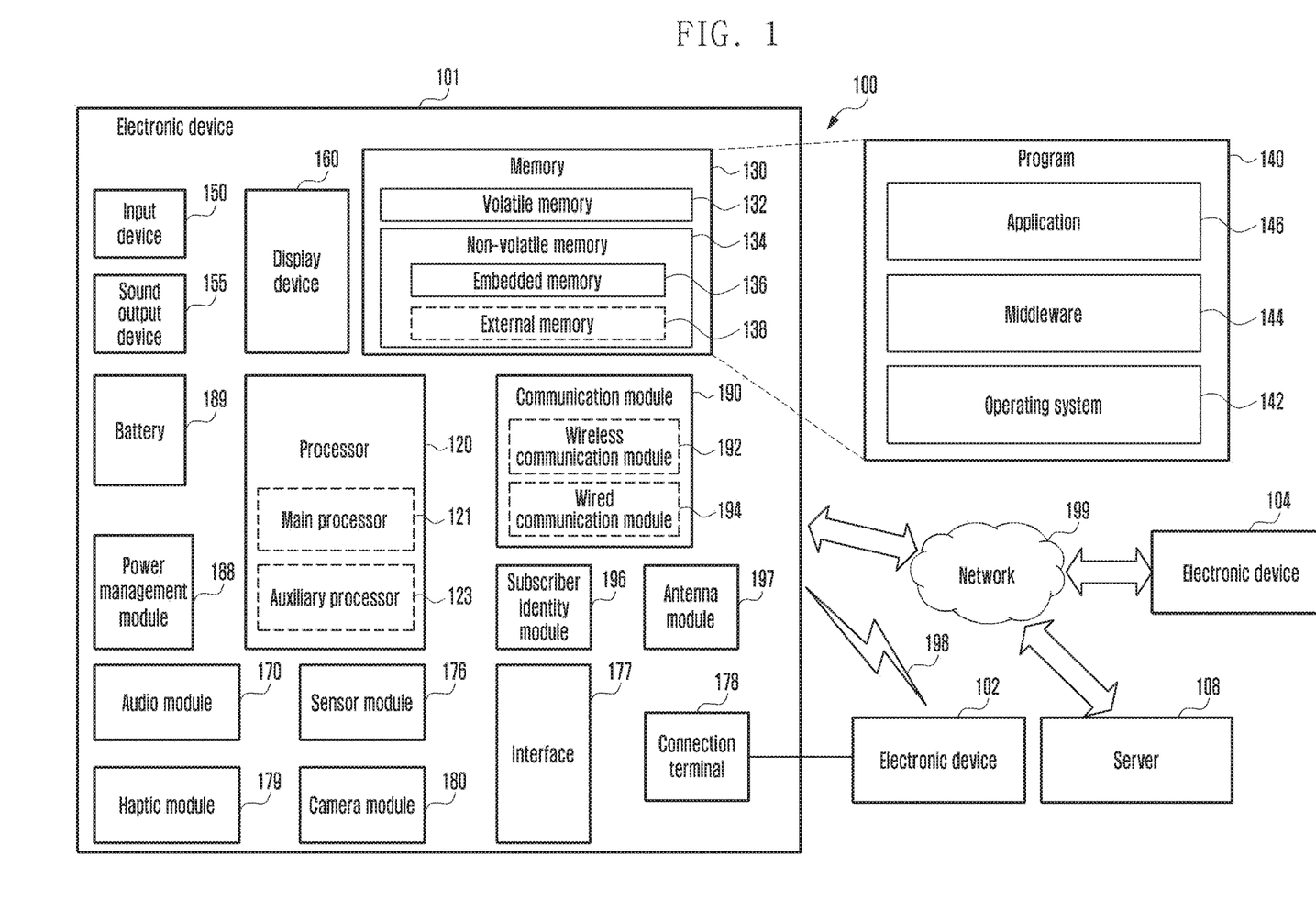
FIG. 1 shows a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with a first external electronic device 102 via a first network 198 (e.g., a short-range wireless communication network), or a second external electronic device 104 or a server 108 via a second network 199 (e.g., a long-range wireless communication network). According to an embodiment, the electronic device 101 may communicate with the second external electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identity module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of, the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., the first external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the first external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the first external electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the first external electronic device 102, the second external electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the second external electronic device 104 via the server 108 coupled with the second network 199. Each of the first and second external electronic devices 102 and 104 may be a device of a same type as, or a different type from, the electronic device 101. According to an embodiment, all or some of operations to be executed at the electronic device 101 may be executed at one or more of the first and second external electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
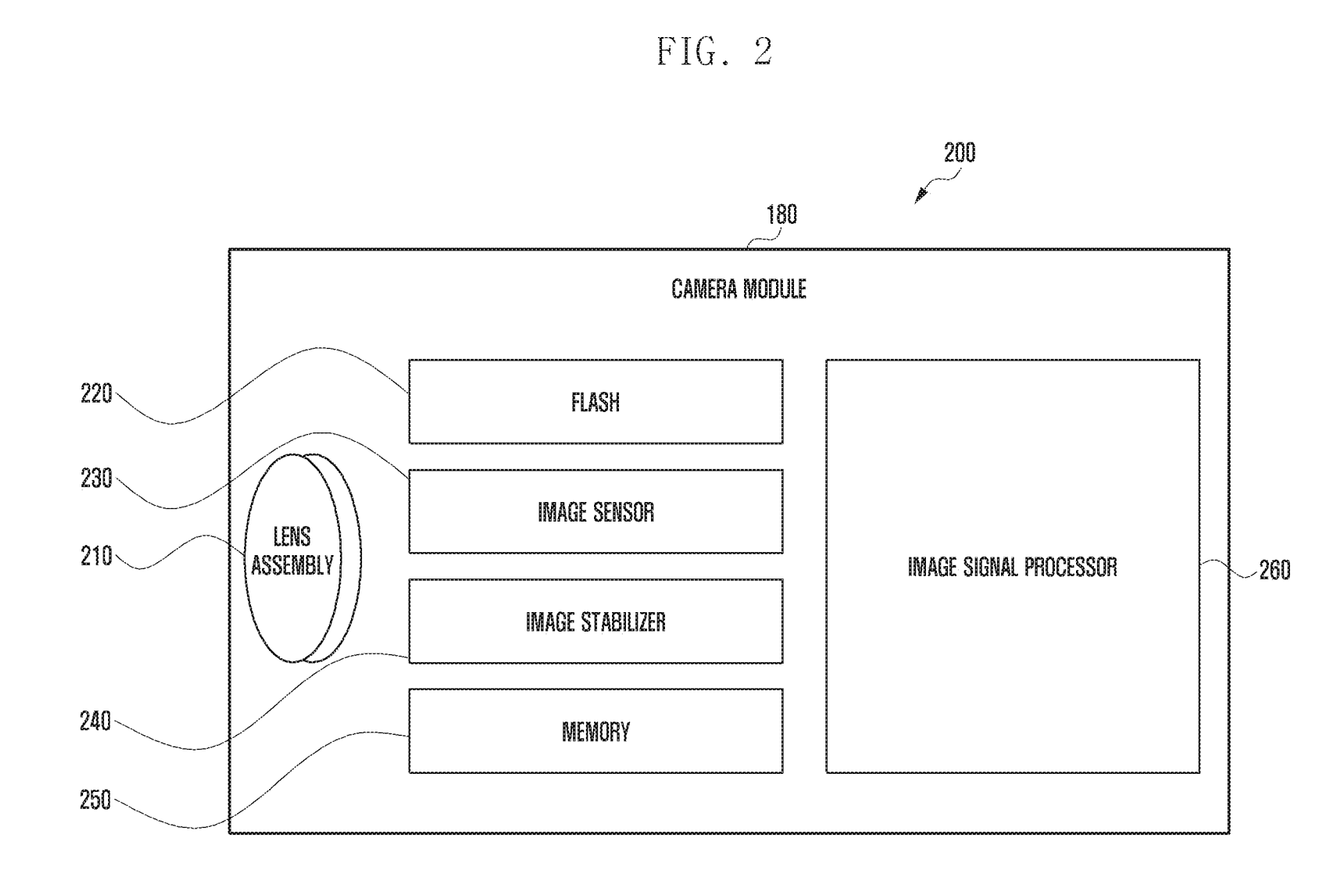
FIG. 2 is a block diagram of a camera module according to an embodiment of the disclosure.

FIG. 2 is a block diagram of a camera module according to an embodiment of the disclosure.

Referring to FIG. 2, a block diagram 200 of the camera module 180 may include a lens assembly 210, a flash 220, an image sensor 230, an image stabilizer 240, a memory 250 (e.g., buffer memory), and an ISP 260. The lens assembly 210 may collect light emitted from a target object whose image is to be captured. The lens assembly 210 may include one or more lenses. In one embodiment, the camera module 180 may include plural lens assemblies. In this case, the camera module 180 may provide, for example, dual camera, 360 degree camera, or spherical camera configurations. Some of the plural lens assemblies may have the same lens properties (e.g., angle of view, focal length, autofocus, f-number, and optical zoom), and some other lens assemblies may have one or more different lens properties. The lens assembly 210 may include, for example, a wide-angle lens or a telephoto lens.

The flash 220 may emit light to reinforce the light emitted or reflected from the target object. In one embodiment, the flash 220 may include at least one light emitting diode (LED) (e.g., red-green-blue (RGB) LED, white LED, infrared LED, or ultraviolet LED), or a xenon lamp. The image sensor 230 can obtain an image corresponding to the target object by converting the light that is emitted or reflected from the target object and transmitted through the lens assembly 210 into an electrical signal. In one embodiment, the image sensor 230 may include one image sensor, a plurality of image sensors having the same attribute, or a plurality of image sensors having different attributes selected from among the image sensors having different attributes, such as an RGB sensor, a black and white (BW) sensor, an IR sensor, or a UV sensor. Each of the image sensors included in the image sensor 230 may be implemented using, for example, a charge coupled device (CCD) sensor or a complementary metal oxide semiconductor (CMOS) sensor.

The image stabilizer 240 may move at least one lens included in the lens assembly 210 in a specific direction or control the operating characteristics of the image sensor 230 (e.g., read-out timing adjustment) in response to movement of the camera module 180 or the electronic device 101 including the camera module 180. This may compensate for at least some of negative effects of the motion on the image being captured. In one embodiment, the image stabilizer 240 may detect movement of the camera module 180 or the electronic device 101 by using a gyro sensor (not shown) or an acceleration sensor (not shown) disposed inside or outside the camera module 180. The image stabilizer 240 can be, for example, an optical image stabilizer. The memory 250 may at least temporarily store at least a portion of the image acquired via the image sensor 230 for subsequent image processing operations. For example, when image acquisition is delayed owing to the shutter or plural images are captured at high speed, the obtained original image (e.g., Bayer-patterned image or high resolution image) may be stored in the memory 250, and a corresponding copy image (e.g., low resolution image) may be previewed through the display device 160. Thereafter, if a specified condition is met (e.g., user input, or system command), at least a portion of the original image stored in the memory 250 may be selected and processed, for example, by the ISP 260. In one embodiment, the memory 250 may be at least a portion of the memory 130, or it may be a separate memory operating independently.

The ISP 260 may perform one or more image processing operations on the image obtained through the image sensor 230 or on the image stored in the memory 250. The image processing operations may include depth map generation, three-dimensional modeling, panorama generation, feature point extraction, image synthesis, or image compensation (e.g., noise reduction, resolution adjustment, brightness adjustment, blurring, sharpening, or softening). Additionally or alternatively, the ISP 260 may control at least one of the components (e.g., the image sensor 230) included in the camera module 180 (e.g., exposure time control, or lead-out timing control). The image processed by the ISP 260 may be stored back in the memory 250 for further processing or may be sent to an external component of the camera module 180 (e.g., the memory 130, the display device 160, the first external electronic device 102, the second external electronic device 104, or the server 108). In one embodiment, the ISP 260 may be at least a part of the processor 120, or may be a separate processor operating independently of the processor 120. When the ISP 260 is a separate processor operating independently of the processor 120, the image processed by the ISP 260 may be displayed by the processor 120 on the display device 160 as it is or after additional image processing.

In one embodiment, the electronic device 101 may include a plurality of camera modules (i.e., each of the plurality of camera modules similar to the camera module 180) having different attributes or functions. In this case, for example, at least one of the plurality of camera modules may be a wide-angle camera, and at least the other may be a telephoto camera. Similarly, at least one of the plurality of camera modules is a front camera, and at least the other one may be a rear camera.

Figure 3:
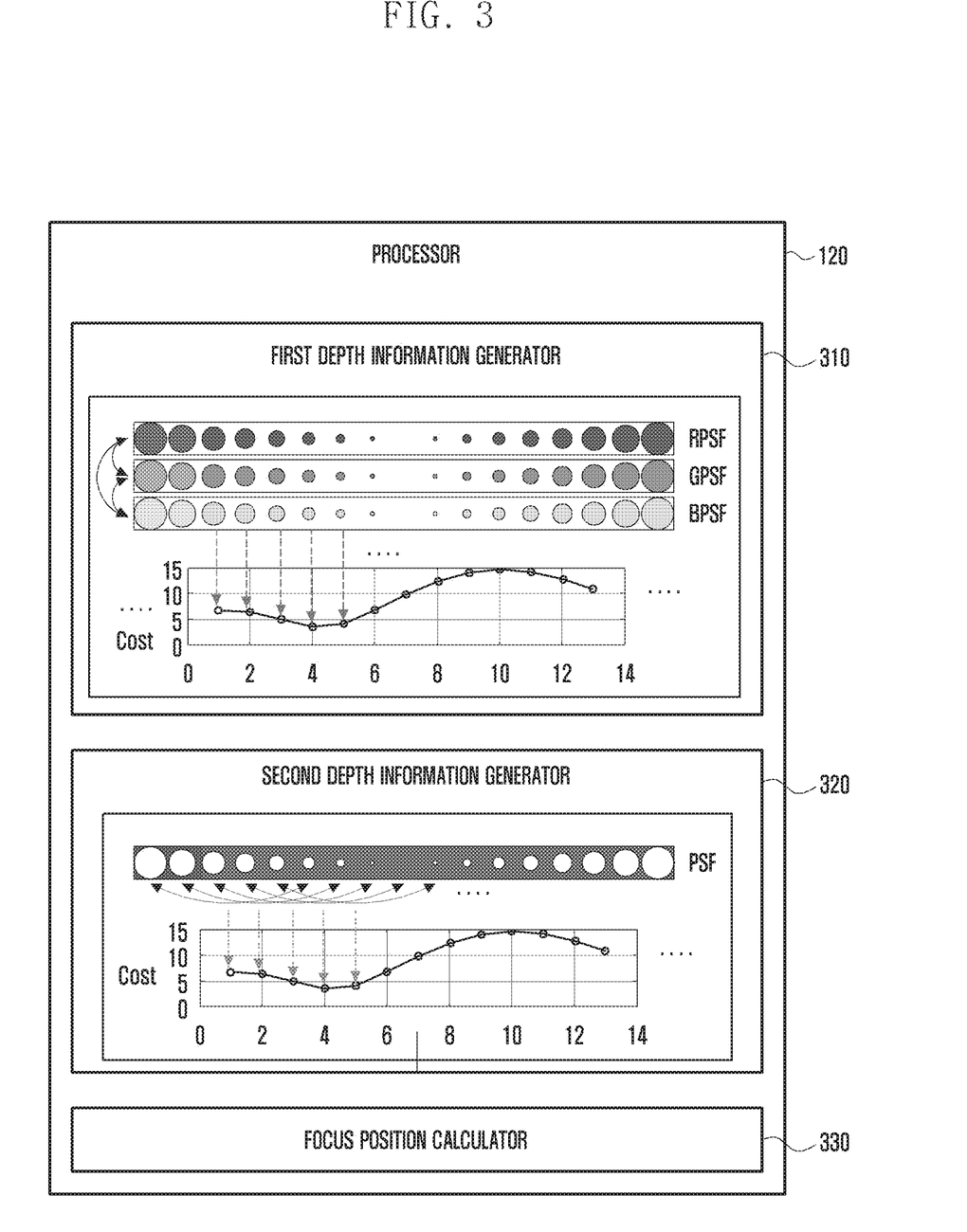
FIG. 3 is a block diagram of an image signal processor (ISP) according to an embodiment of the disclosure.

FIG. 3 is a block diagram of the processor according to an embodiment of the disclosure.

Referring to FIG. 3, the processor 120 may include a first depth information generator 310, a second depth information generator 320, and a focus position calculator 330. In one embodiment, one of the above components of the processor 120 may be omitted, and one or more new components may be added to the processor 120. In one embodiment, the processor 120 may be the ISP 260, and the first depth information generator 310, the second depth information generator 320, and the focus position calculator 330 may be included in the ISP 260.

In various embodiments of the disclosure, the first depth information generator 310 may use the image to generate a first color image corresponding to the first color and a second color image corresponding to the second color. For example, the first depth information generator 310 may use a Bayer pattern RGB image to generate at least two color images among a red image, a green image, and a blue image. For a display object included in the image, the first depth information generator 310 may determine the difference in first spread level between the display object in a first color image and the display object in a second color image.

In various embodiments of the disclosure, the first depth information generator 310 may store a point spread function corresponding to the first color and a point spread function corresponding to the second color, and may use these point spread functions to determine the difference in first spread level between the display object in a first color image and the display object in a second color image.

In one embodiment of the disclosure, the first depth information generator 310 may perform a chromatic DFD operation. The first depth information generator 310 may generate at least three color images based on a first image, compare each of the at least three color images with each other, and obtain at least three first spread-level differences. For example, when generating a red image, a green image, and a blue image using an RGB image, the first depth information generator 310 may compare each of the color images with each other and identify the first spread-level differences for the three cases.

In various embodiments of the disclosure, the second depth information generator 320 may identify the difference in second spread level between external objects included in at least two images. The second depth information generator 320 may model the size of the blur corresponding to the focal length and store it as a point spread function, and may identify the difference in second spread level by using this point spread function. In one embodiment, the second depth information generator 320 may perform the DFD operation using two or more images obtained at different positions. In various embodiments, the focus position calculator 330 may estimate the on-focus position. For example, the focus position calculator 330 may determine the first on-focus position based on the difference in first spread level identified by the first depth information generator 310, and may determine the second on-focus position based on the difference in second spread level identified by the second depth information generator 320.

Figure 4:
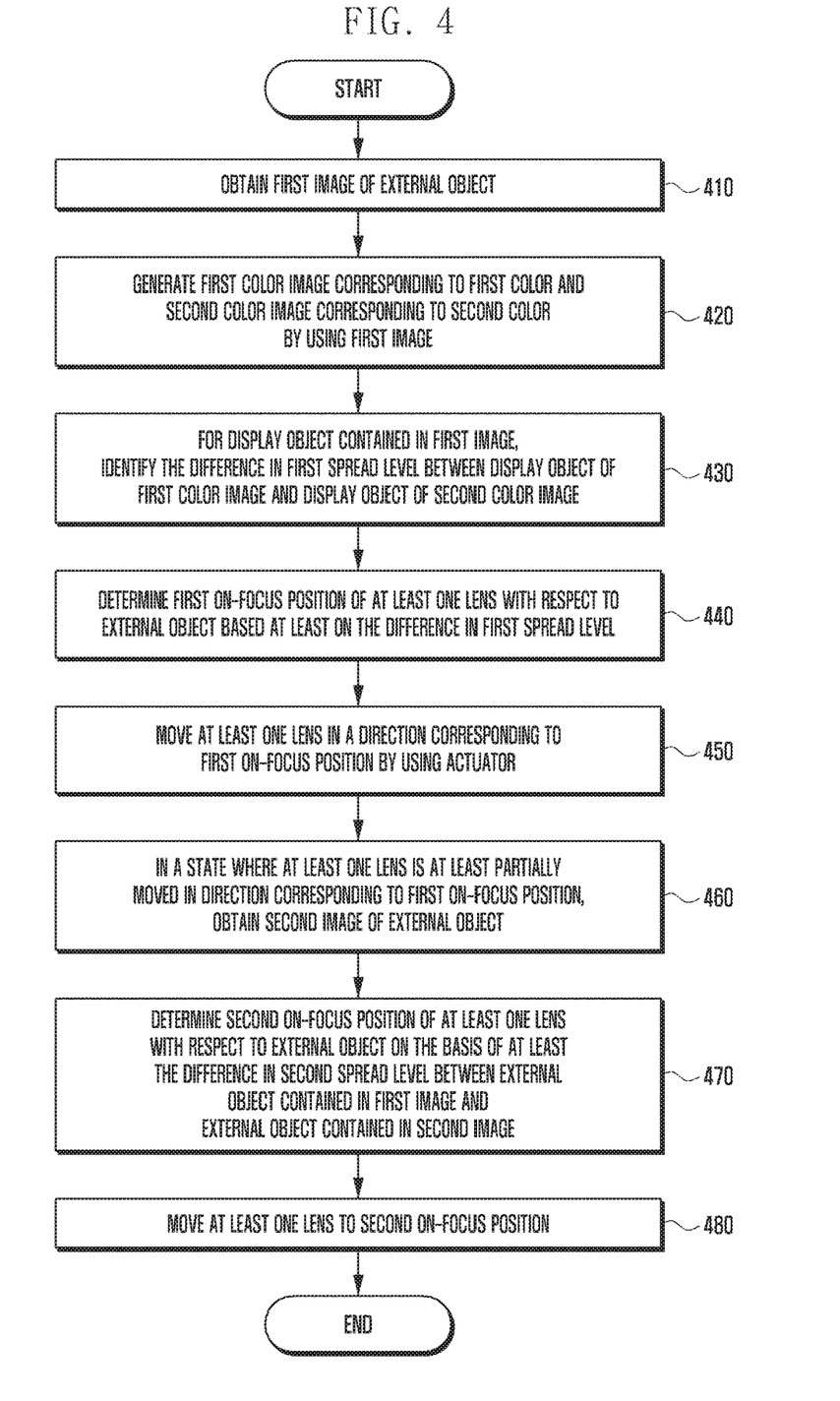
FIG. 4 is a flowchart of an automatic focus adjustment method according to an embodiment of the disclosure.

FIG. 4 is a flowchart of a method for focus adjustment based on the spread level of a display object according to an embodiment of the disclosure.

Referring to FIG. 4, at operation 410, the processor 120 (or the ISP 260 in FIG. 2) of the electronic device 101 may obtain a first image of an external object (e.g., target object) by using the image sensor (e.g., the image sensor 230 in FIG. 2). For example, the electronic device 101 may place at least one lens of the lens assembly (e.g., the lens assembly 210 in FIG. 2) at a first position, and may obtain a first image corresponding to the external object by converting the light transmitted from the external object (e.g., target object) through the lens assembly into an electrical signal.

At operation 420, the processor 120 (or the ISP 260 in FIG. 2) of the electronic device 101 may use the first image to generate a first color image corresponding to the first color and a second color image corresponding to the second color. For example, the electronic device 101 may select two colors with different imaging positions from plural color planes and generate two images corresponding respectively to the selected colors.

In one embodiment, the electronic device 101 may generate at least two color images among a red image, a green image, and a blue image on the basis of the RGB channel. As another example, the electronic device 101 may generate a white image and a black image by using the first image.

At operation 430, the processor 120 (or the ISP 260 in FIG. 2) of the electronic device 101 may, for a display object included in the first image, identify the difference in first spread level between the display object of the first color image and the display object of the second color image (here, the display object of the first color image and the display object of the second color image correspond respectively to the display object included in the first image). In various embodiments, the electronic device 101 may use a chromatic DFD technique to identify the difference in first spread level between the display object of the first color image and the display object of the second color image. The chromatic DFD technique uses the difference in imaging position between the first color and the second color depending on the chromatic aberration. For example, the first color image and the second color image may contain blurs of different sizes depending on the difference in imaging position. In one embodiment, each of the first color image and the second color image may not contain a blur or may contain a very small blur. In this case, the processor 120 may estimate that the current focus position is the first on-focus position or is close to the first on-focus position.

In one embodiment of the disclosure, the blurs contained in the first color image and the second color image have a shape similar to that of the lens aperture, but may have different sizes due to differences in imaging positions. For example, the blurs contained in the first color image and the second color image may each be formed in the exit pupil shape, but their sizes may be different according to the chromatic aberration.

In various embodiments of the disclosure, the electronic device 101 may model the size of a blur corresponding to the degree of defocus for each color and store it in the form of a point spread function (PSF) for each color. For example, the point spread function can be modeled so as to have the smallest blur size at the on-focus position and have a larger blur as the degree of defocus increases. Specifically, the electronic device 101 can identify the spread level of the first color image by comparing the blur contained in the first color image with the point spread function of the first color. The electronic device 101 can identify the spread level of the second color image by comparing the blur contained in the second color image with the point spread function of the second color. The processor 120 may identify the difference in first spread level by comparing the spread level of the first color image with the spread level of the second color image.

At operation 440, the processor 120 (or the ISP 260 in FIG. 2) of the electronic device 101 may determine the first on-focus position of the at least one lens with respect to the external object based at least on the difference in first spread level.

For example, the electronic device 101 may identify the degree of defocus of the first color image and the degree of defocus of the second color image and may estimate the distance between the at least one lens and the display object. The electronic device 101 may determine a first on-focus position for the at least one lens based on the estimated distance and the specified focus distance. In one embodiment, the electronic device 101 may determine the movement direction of the at least one lens on the basis of the determined first on-focus position.

At operation 450, the processor 120 (or the ISP 260 in FIG. 2) of the electronic device 101 may utilize the actuator to move the at least one lens in a direction corresponding to the determined first on-focus position. For example, depending on the type of the lens assembly, all or some lenses constituting the lens assembly can be moved to the first on-focus position.

The first on-focus position determined using the chromatic DFD technique may be somewhat inaccurate. For example, if at least one lens is moved to the first on-focus position determined using the chromatic DFD technique, excessive movement may occur over the actual on-focus position. In such a case, to place the at least one lens at the actual on-focus position, the at least one lens must be moved in a direction opposite to the direction in which it was moved, which may cause the wobbling phenomenon and unnecessary power consumption. In various embodiments, the electronic device 101 may move the at least one lens to a position between the current focus position (e.g., first position) and the first on-focus position.

In various embodiments, the electronic device 101 may measure the travel distance required to move at least one lens to the determined first on-focus position and may move the at least one lens by a distance shorter than the measured travel distance by using the actuator. For example, at least one lens can be moved by about ½ or ¼ of the measured travel distance according to an internal rule. Alternatively, a movement distance can be specified in advance, and at least one lens can be moved according to the specified movement distance.

In one embodiment, the electronic device 101 may determine the confidence for the difference in first spread level by using a confidence function. The electronic device 101 may determine the confidence for the difference in first spread level and determine the travel distance of at least one lens based on the determined confidence. For example, if the determined confidence is below a preset threshold, at least one lens can be moved by a first distance; and if the determined confidence is above the preset threshold, at least one lens can be moved by a second distance greater than the first distance.

At operation 460, in a state where the at least one lens is at least partially moved in the direction corresponding to the first on-focus position, the processor 120 (or the ISP 260 in FIG. 2) of the electronic device 101 may obtain a second image of the external object by using the image sensor.

In various embodiments, the processor 120 of the electronic device 101 may obtain a second image of the external object. For example, the electronic device 101 may place at least one lens of the lens assembly (e.g., the lens assembly 210 in FIG. 2) at a second position, and may obtain a second image corresponding to the external object by converting the light transmitted from the external object (e.g., target object) through the lens assembly into an electrical signal.

At operation 470, the processor 120 (or the ISP 260 in FIG. 2) of the electronic device 101 may determine a second on-focus position of the at least one lens with respect to the external object on the basis of at least the difference in second spread level between the external object contained in the first image and the external object contained in the second image.

In various embodiments, the electronic device 101 may use the DFD technique to identify the difference in second spread level between the external object contained in the first image and the external object contained in the second image. That is, as the first image and the second image are obtained by photographing the external object at different distances, it is possible to exploit the fact that the external objects contained in these images can have blurs of different sizes.

In one embodiment, the blurs contained in the first image and the second image have a shape similar to that of the lens aperture, but may have different sizes due to differences in imaging positions. For example, the blurs contained in the first image and the second image may each be formed in the exit pupil shape, but their sizes may be different.

In various embodiments, the electronic device 101 may model the size of a blur corresponding to the focal distance and store it in the form of a point spread function, and may determine a second on-focus position of the at least one lens with respect to the external object on the basis of the modeled point spread function. For example, the point spread function can be modeled so as to have the smallest blur size at the on-focus position and have a larger blur as the degree of defocus increases.

At operation 480, the processor 120 of the electronic device 101 may use the actuator to move the at least one lens to the second on-focus position. For example, depending on the type of the lens assembly, all or some lenses constituting the lens assembly can be moved to the second on-focus position.

In various embodiments, in a state where the at least one lens is at least partially moved in the direction corresponding to the second on-focus position, the processor 120 of the electronic device 101 may obtain a third image of the external object by using the camera module.

Figure 5:
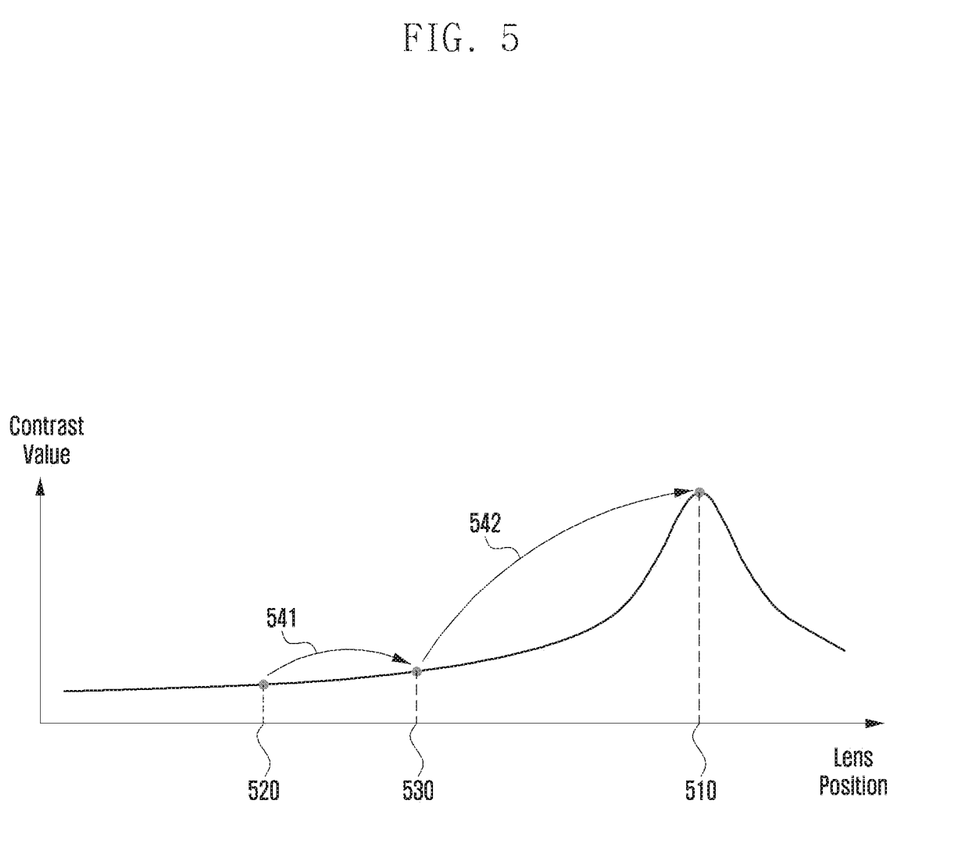
FIG. 5 depicts a process of moving at least one lens according to an embodiment of the disclosure.

FIG. 5 depicts a process of moving at least one lens according to an embodiment of the disclosure.

Referring to FIG. 5, a first position 510 indicates the on-focus position of at least one lens and a second position 520 indicates the current focus position of the at least one lens according to an embodiment of the disclosure. In one embodiment, the on-focus position may be the position with the highest contrast level.

In various embodiments, the processor 120 of the electronic device 101 may obtain a first image of an external object at the current focus position (i.e., the second position 520) of at least one lens, and may use the first image to generate a first color image corresponding to the first color and a second color image corresponding to the second color. The processor 120 of the electronic device 101 may, for a display object contained in the first image, identify the difference in first spread level between the display object of the first color image and the display object of the second color image, and may determine a first on-focus position of the at least one lens. The determined first on-focus position may not coincide with the first position 510. However, by using the first on-focus position, it is possible to estimate the direction of the on-focus position of the at least one lens.

In various embodiments, the processor 120 of the electronic device 101 may utilize the actuator to move the at least one lens in a direction corresponding to the determined first on-focus position. For example, the processor 120 of the electronic device 101 may move the at least one lens to a position (e.g., a third position 530) between the current focus position (e.g., the second position 520) and the first on-focus position, as shown at reference character 541.

In various embodiments, the processor 120 of the electronic device 101 may place the at least one lens at the third position 530 and obtain a second image of the external object. The processor 120 of the electronic device 101 may determine a second on-focus position of the at least one lens with respect to the external object on the basis of at least the difference in second spread level between the external object contained in the first image and the external object contained in the second image. Here, the second on-focus position may be determined to be the first position 510 or a position close to the first position 510.

In various embodiments, the processor 120 of the electronic device 101 may use the actuator to move the at least one lens to a second on-focus position. For example, the processor 120 of the electronic device 101 may move the at least one lens from the third position 530 to the first position 510, as shown at reference character 542.

Figure 6:
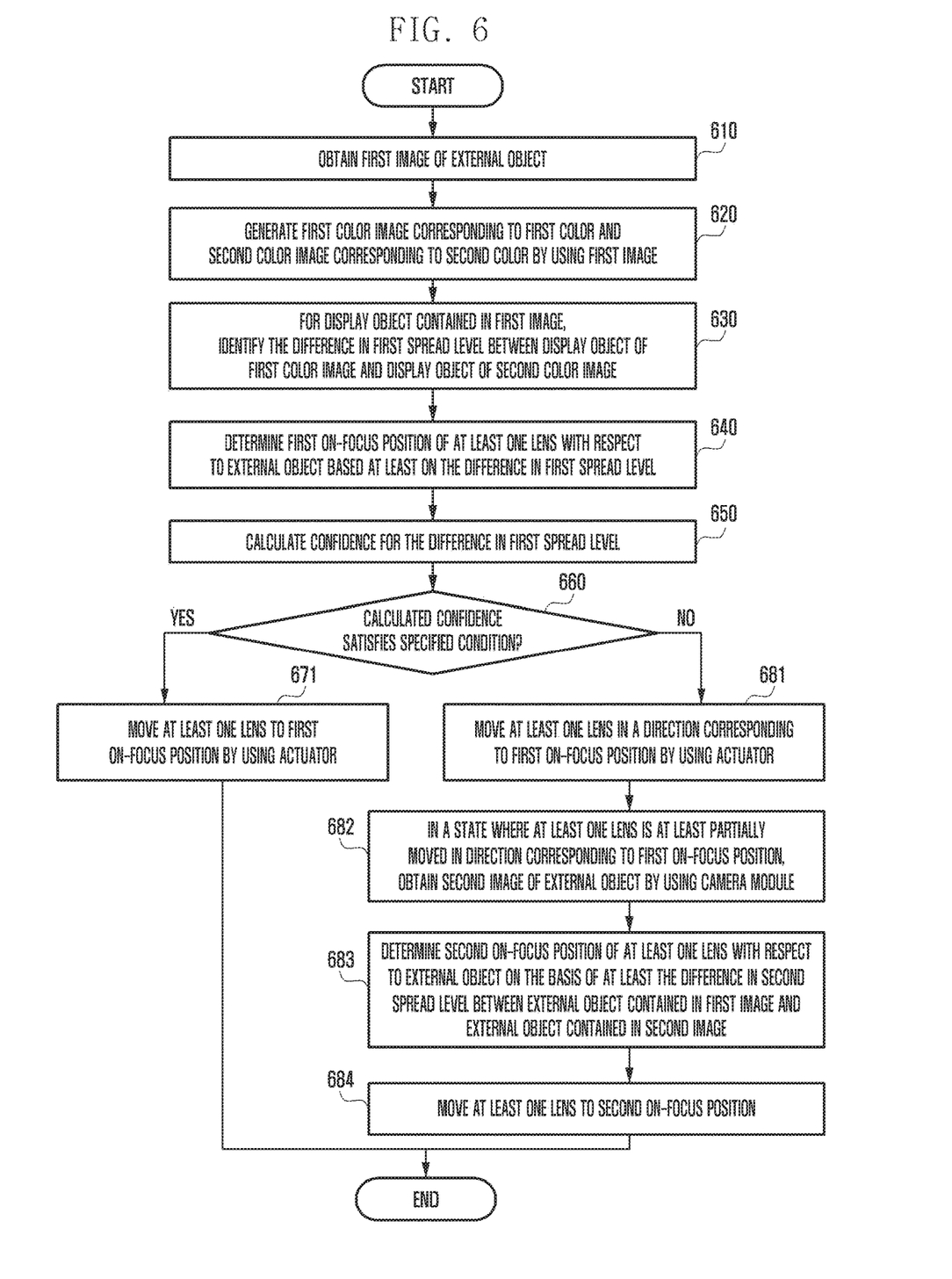
FIG. 6 is a flowchart of an automatic focusing method according to an embodiment of the disclosure.

FIG. 6 is a flowchart of a method for focus adjustment based on the spread level of a display object according to an embodiment of the disclosure.

Referring to FIG. 6, at operation 610, the processor 120 (or the ISP 260 in FIG. 2) of the electronic device 101 may obtain a first image of an external object by using the image sensor (e.g., the image sensor 230 in FIG. 2). For example, the electronic device 101 may place at least one lens of the lens assembly (e.g., the lens assembly 210 in FIG. 2) at a first position, and may obtain a first image corresponding to the external object by converting the light transmitted from the external object (e.g., target object) through the lens assembly into an electrical signal. As operation 610 is substantially identical to operation 410 of FIG. 4, refer to the description on operation 410 of FIG. 4 for more details.

At operation 620, the processor 120 (or the ISP 260 in FIG. 2) of the electronic device 101 may use the first image to generate a first color image corresponding to the first color and a second color image corresponding to the second color. For example, the processor 120 of the electronic device 101 may use the first image and a Bayer pattern RGB image to generate at least two color images among a red image, a green image, and a blue image. As operation 620 is substantially identical to operation 420 of FIG. 4, refer to the description on operation 420 of FIG. 4 for more details.

At operation 630, the processor 120 (or the ISP 260 in FIG. 2) of the electronic device 101 may, for a display object included in the first image, identify the difference in first spread level between the display object of the first color image and the display object of the second color image. In various embodiments, the electronic device 101 may use a chromatic DFD technique to identify the difference in first spread level between the display object of the first color image and the display object of the second color image. As operation 630 is substantially identical to operation 430 of FIG. 4, refer to the description on operation 430 of FIG. 4 for more details.

At operation 640, the processor 120 (or the ISP 260 in FIG. 2) of the electronic device 101 may determine the first on-focus position of the at least one lens with respect to the external object based at least on the difference in first spread level. As operation 640 is substantially identical to operation 440 of FIG. 4, refer to the description on operation 440 of FIG. 4 for more details.

At operation 650, the processor 120 (or the ISP 260 in FIG. 2) of the electronic device 101 may compute the confidence for the difference in first spread level.

In various embodiments, the electronic device 101 may calculate the confidence on the basis of the contrast value for the first image and the parameter value for determining the accuracy thereof. For example, the confidence can be calculated based on the fact that the contrast value can decrease as the degree of defocus increases.

In various embodiments, the electronic device 101 may generate at least three color images based on the first image, compare each of the at least three color images with each other, and obtain at least three first spread-level differences. For example, when generating a red image, a green image, and a blue image using the first image, it is possible to obtain three differences in first spread level for the three cases of red and green images, green and blue images, and blue and red images. The electronic device 101 may calculate the confidence based on the at least three differences in first spread level. For example, if at least three differences in first spread level obtained based on a single image are equal to each other or are very small, they can be determined to have a high confidence. Depending on the embodiment, operation 650 may be carried out before operation 640.

At operation 660, the processor 120 (or the ISP 260 in FIG. 2) of the electronic device 101 may determine whether the calculated confidence satisfies the specified condition. If the calculated confidence satisfies the specified condition, at operation 671, the processor 120 (or the ISP 260 in FIG. 2) of the electronic device 101 may utilize the actuator to move the at least one lens to the first on-focus position.

If the confidence is very high, this may indicate that the current focus position of the at least one lens is at the on-focus position or is quite close to the on-focus position. In this case, the first on-focus position determined by the chromatic DFD technique may be substantially close to the actual on-focus position. That is, if the calculated reliability meets the specified condition, the at least one lens may not be moved or may be moved a very small distance.

If the calculated confidence does not satisfy the specified condition, at operation 681, the processor 120 (or the ISP 260 in FIG. 2) of the electronic device 101 may utilize the actuator to move the at least one lens in a direction corresponding to the determined first on-focus position. As operation 681 is substantially identical to operation 450 of FIG. 4, refer to the description on operation 450 of FIG. 4 for more details.

At operation 682, in a state where the at least one lens is at least partially moved in the direction corresponding to the first on-focus position, the processor 120 (or the ISP 260 in FIG. 2) of the electronic device 101 may obtain a second image of the external object by using the camera module. As operation 682 is substantially identical to operation 460 of FIG. 4, refer to the description on operation 460 of FIG. 4 for more details.

At operation 683, the processor 120 (or the ISP 260 in FIG. 2) of the electronic device 101 may determine a second on-focus position of the at least one lens with respect to the external object on the basis of at least the difference in second spread level between the external object contained in the first image and the external object contained in the second image. As operation 683 is substantially identical to operation 470 of FIG. 4, refer to the description on operation 470 of FIG. 4 for more details.

At operation 684, the processor 120 (or the ISP 260 in FIG. 2) of the electronic device 101 may use the actuator to move the at least one lens to the second on-focus position. As operation 684 is substantially identical to operation 480 of FIG. 4, refer to the description on operation 480 of FIG. 4 for more details.

Figure 7A:
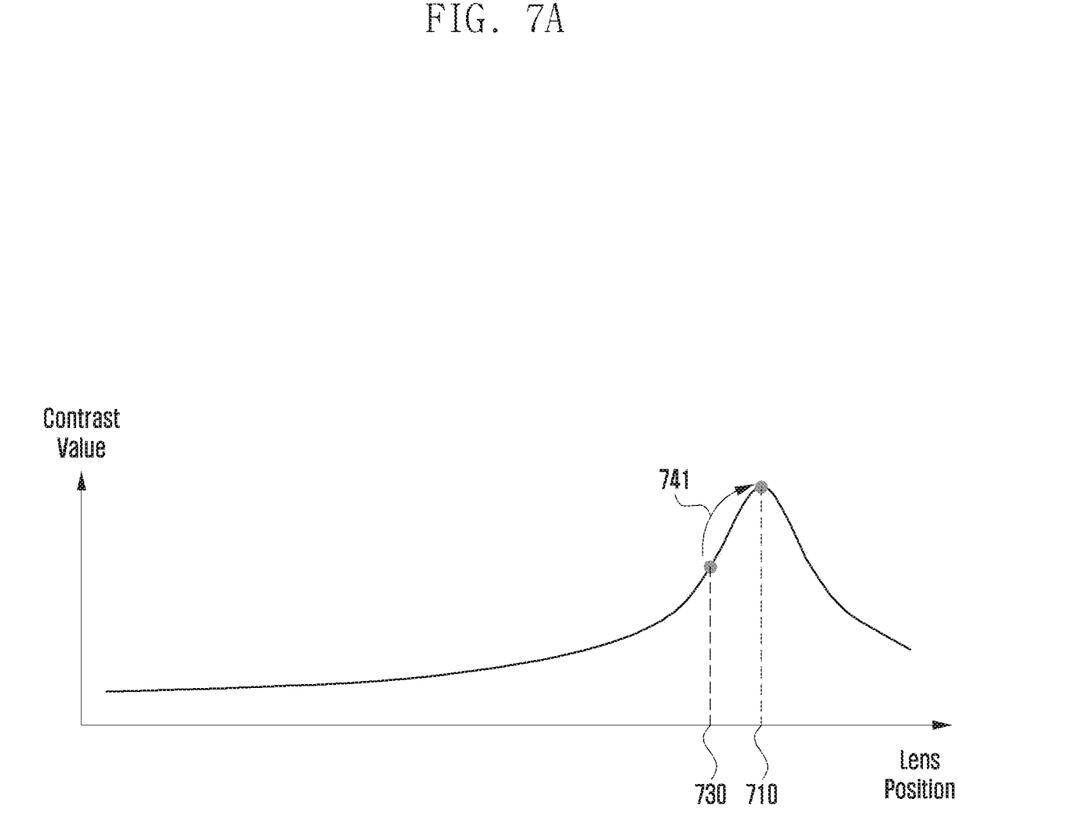
FIGS. 7A and 7B depict a process of moving at least one lens according to various embodiments of the disclosure.
Figure 7B:
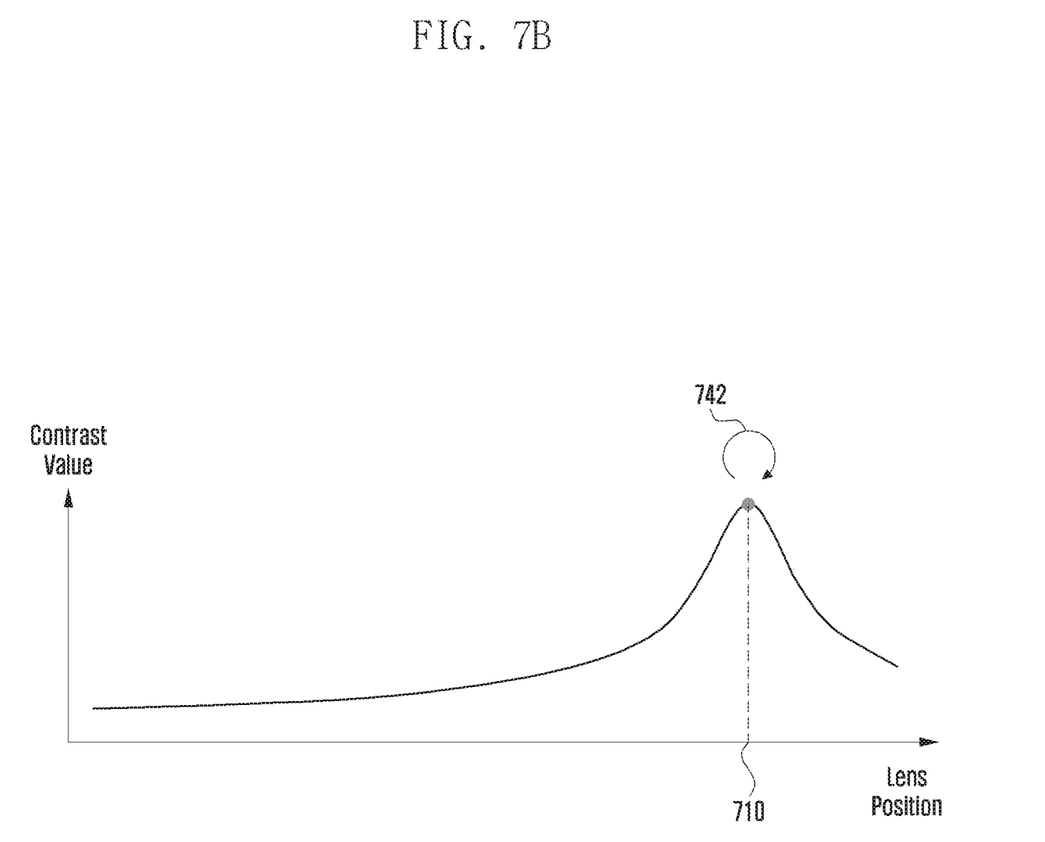

FIGS. 7A and 7B depict a process of moving at least one lens according to various embodiments of the disclosure.

Referring to FIGS. 7A and 7B, a first position 710 indicates a first on-focus position of at least one lens and a second position 730 indicates the current focus position of the at least one lens, according to various embodiments of the disclosure.

In various embodiments, the processor 120 of the electronic device 101 may obtain a first image of an external object at the current focus position (i.e., the second position 730) of at least one lens, and may use the first image to generate a first color image corresponding to the first color and a second color image corresponding to the second color. The processor 120 of the electronic device 101 may, for a display object contained in the first image, identify the difference in first spread level between the display object of the first color image and the display object of the second color image, and may determine a first on-focus position of the at least one lens with respect to the external object based on at least the difference in first spread level.

In various embodiments, the processor 120 of the electronic device 101 may compute the confidence for the difference in first spread level. If the calculated confidence satisfies the specified condition, the processor 120 may utilize the actuator to move the at least one lens to the first on-focus position. For example, in FIG. 7A, at least one lens may be moved from the second position 730 to the first position 710, as shown at reference character 741.

In one embodiment, the current focus position (e.g., the second position 730) of the at least one lens may be the first position 710 or close to the first position 710. For example, FIG. 7B shows a case where the current focus position of the at least one lens is the first on-focus position (e.g., the first position 710). In this case, the electronic device 101 may not move the at least one lens (e.g., indicated by retry operation 742). That is, it is possible to rapidly and efficiently measure the distance to the target object without unnecessarily capturing two images.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1$^{st}$" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., embedded memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a camera comprising:
  a lens assembly including one or more lenses,
  an actuator configured to move at least one lens of the lens assembly, and
  an image sensor; and
a processor configured to:
  obtain a first image of an external object using the image sensor,
  generate a first color image, which corresponds to a first color, and a second color image, which corresponds to a second color, from the first image,
  identify, for a display object contained in the first image, an amount of difference in a first spread level between the display object of the first color image and the display object of the second color image,
  determine a first on-focus position of the at least one lens with respect to the external object based on at least the amount of difference in the first spread level,
  move the at least one lens in a direction corresponding to the first on-focus position by using the actuator,
  obtain, in a state where the at least one lens is at least partially moved in the direction corresponding to the first on-focus position, a second image of the external object by using the image sensor,
  determine a second on-focus position of the at least one lens with respect to the external object based on at least an amount of difference in a second spread level between the external object contained in the first image and the external object contained in the second image, and
  move the at least one lens to the second on-focus position by using the actuator.

2. The electronic device of claim 1, wherein the processor is further configured to obtain a third image of the external object by using the image sensor in a state where the at least one lens is moved to the second on-focus position.

3. The electronic device of claim 1, wherein the processor is further configured to move the at least one lens to a position between a current focus position and the first on-focus position so as to reach a state where the at least one lens is at least partially moved in the direction corresponding to the first on-focus position.

4. The electronic device of claim 1, wherein the processor is further configured to:
measure a distance required to move the at least one lens to the first on-focus position, and
move the at least one lens by a specified distance based on at least the amount of difference in the first spread level, or move the at least one lens by half or quarter of the distance based on an internal rule.

5. The electronic device of claim 1, wherein the processor is further configured to:
calculate a confidence for the amount of difference in the first spread level using a confidence function, and
determine a travel distance of the at least one lens based on the confidence to obtain the second image.

6. A method for focus adjustment, the method comprising:
obtaining a first image of an external object by using a camera;
generating a first color image, which corresponds to a first color, and a second color image, which corresponds to a second color, from the first image;
identifying, for a display object contained in the first image, an amount of difference in a first spread level between the display object of the first color image and the display object of the second color image;
determining a first on-focus position of at least one lens in the camera with respect to the external object based on at least the amount of difference in the first spread level;
moving the at least one lens of the camera in a direction corresponding to the first on-focus position;
obtaining, in a state where the at least one lens is at least partially moved in the direction corresponding to the first on-focus position, a second image of the external object;
determining a second on-focus position of the at least one lens with respect to the external object based on at least an amount of difference in a second spread level between the external object contained in the first image and the external object contained in the second image; and
moving the at least one lens to the second on-focus position.

7. The method of claim 6, further comprising obtaining a third image of the external object by using an image sensor in a state where the at least one lens is moved to the second on-focus position.

8. The method of claim 6, wherein the moving of the at least one lens in the direction corresponding to the first on-focus position comprises moving the at least one lens to a position between a current focus position and the first on-focus position.

9. The method of claim 6, further comprising:
measuring a distance required to move the at least one lens to the first on-focus position; and
moving the at least one lens a specified distance based on at least the amount of difference in first spread level, or moving the at least one lens by half or quarter of the distance based on an internal rule.

10. The method of claim 6, further comprising:
calculating a confidence for the amount of difference in the first spread level using a confidence function; and
determining a travel distance of the at least one lens based on the confidence to obtain the second image.

* * * * *